United States Patent [19]

Lamatsch et al.

[11] Patent Number: 4,466,182
[45] Date of Patent: Aug. 21, 1984

[54] STATOR FOR AN ELECTRIC POLYPHASE MOTOR

[75] Inventors: Hans Lamatsch, Nuremberg; Helmut Schmidt, Reichenberg; Bodo Ulrich, Lengfeld; Karl-Heinz Braungardt, Würzburg, all of Fed. Rep. of Germany

[73] Assignee: Siemens Aktiengesellschaft, Munich, Fed. Rep. of Germany

[21] Appl. No.: 343,909

[22] Filed: Jan. 29, 1982

Related U.S. Application Data

[62] Division of Ser. No. 865,258, Dec. 28, 1977, abandoned.

[30] Foreign Application Priority Data

Dec. 29, 1976 [DE] Fed. Rep. of Germany ....... 2659384

[51] Int. Cl.³ ............................................. H02K 15/14
[52] U.S. Cl. .......................................... 29/596; 310/42; 310/43
[58] Field of Search ...................... 29/596; 310/42, 43, 310/40 R, 40 HM, 49 R, 218, 258–260, 256; 264/272.14, 272.19

[56] References Cited

U.S. PATENT DOCUMENTS

| | | | |
|---|---|---|---|
| 2,607,816 | 8/1952 | Ryder et al. | 29/596 |
| 2,804,680 | 9/1957 | Flagg, Jr. | 29/596 |
| 3,914,859 | 10/1975 | Pierson | 29/596 |

Primary Examiner—Howard N. Goldberg
Assistant Examiner—P. W. Echols
Attorney, Agent, or Firm—Kenyon & Kenyon

[57] ABSTRACT

An improved stator for an electric polyphase motor, particularly a stepping motor, is disclosed. The stator includes a pole piece star having axially integral pole pieces arranged in star-like fashion around the hollow cylinder with the radial inner ends of the pole pieces located in the hollow cylinder and protruding a predetermined small distance beyond the inner wall of the hollow cylinder. Thus, the hollow cylinder is set back from the radial inner edges of the pole pieces to provide minimum sized air gaps without requiring finishing operations on the cylinder after the motor is assembled. The radial outer ends of the pole pieces are welded to the surrounding ring housing by laser beam welding. The hollow cylinder is disclosed as an injection-molded part with the pole pieces molded therein simultaneous with the injection molding. A core mold for the cylinder is also disclosed.

7 Claims, 7 Drawing Figures

STATOR FOR AN ELECTRIC POLYPHASE MOTOR

This is a division of application Ser. No. 865,258 filed Dec. 28, 1977, now abandoned.

CROSS-REFERENCE TO RELATED APPLICATIONS

Part of the subject matter of this application is common to application Ser. No. 835,784 filed on Sept. 22, 1977, now abandoned, this application being assigned to the assignee of application Ser. No. 835,784.

BACKGROUND OF THE INVENTION

The invention relates in general to a stator for an electric polyphase motor, particularly a stepping motor with a ring housing and pole pieces arranged in star-like fashion which can be inserted therein and can be wound from the outside. More particularly the invention relates to a stator for a polyphase motor having axially integral pole pieces which are arranged in star-like fashion around a hollow cylinder and are inserted into the hollow cylinder.

In one known stator of this type (German Offenlegungsschrift No. 18 14 977) the pole pieces sit with their one end in a hollow cylinder of plastic; for this purpose, they extend into the hollow cylinder up to a certain radial depth, so that either a circular intermediate layer of plastic remains between the radial inner limit of the pole pieces forming the legs of the star and the air gap proper, or the hollow cylinder must be turned from the inside in a further operation in order to obtain a particularly small air gap between the legs and the rotor.

In motors having a hollow cylinder which extends to the bore diameter and, therefore, to the radial inner ends of the pole pieces forming legs of the star, the necessary space for the air gap is provided by removing plastic material, particularly flash formations, by separate finishing operations after molding.

SUMMARY OF THE INVENTION

It is an object of the present invention to provide an improved stator having minimum sized air gaps on the inner wall of a completed hollow cylinder without requiring finishing operations and at the same time not impairing the electrical data of the motor.

These and other objects are achieved by an improved stator which includes a pole piece star having axially integral pole pieces arranged in star-like fashion around the hollow cylinder with the radial inner ends of the pole pieces located in the hollow cylinder. According to the present invention, the inner wall of the hollow cylinder is set back from the radial inner ends of the pole pieces. One aspect of the invention provides for producing the hollow cylinder as a molded part with the pole pieces simultaneously molded therein and the radial inner edges thereof protruding by a predetermined small distance beyond the inner wall of the hollow cylinder. A cylindrical core mold is used to mold the hollow cylinder and corresponds to the aforementioned rotor bore. The core mold is provided with axially extending slots, the widths of which correspond to the thickness of the radially inner ends of the pole pieces and the depths of which correspond to the desired set back of the hollow cylinder from the radial inner ends of the pole pieces. After the motor is assembled, the cylinder is not subjected to any further finishing operation. The radial outer ends of the pole pieces are welded to the surrounding closed ring housing on the inside starting at the outer circumference of the latter by high-energy beam weldings.

Further in accordance with the invention, the pole pieces are welded to the ring housing by means of laser beam welding.

These and other aspects of the present invention will be more apparent from the following description of the preferred embodiment thereof when considered with the accompanying drawings.

BRIEF DESCRIPTION OF THE DRAWING

The present invention is illustrated by way of example and not limitation in the figures of the accompanying drawings in which like references indicate similar parts and in which.

DETAILED DESCRIPTION OF THE INVENTION

In its basic design, the stator for a stepping motor consists of a pole piece star which is formed by individual pole pieces 3 and a hollow cylinder 1 and is inserted into a ring housing 2. In the slot spaces formed between the side walls of the pole pieces 3 as well as by the ring housing 2 and the hollow cylinder 1, a winding 4 is placed. This may be a prefabricated winding in the form of prefabricated coils using the winding insertion technique, or the winding 4 may be wound onto the pole piece star by a machine using the needle winding technique.

Figure 1:
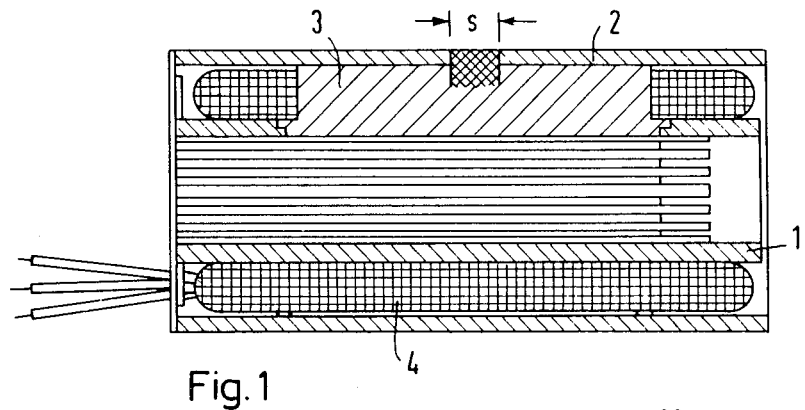
FIG. 1 is an axial cross-sectional view of the stator according to the present invention.

For the sake of clarity, the assembled winding 4 is shown only in FIG. 1; for the same reason, the attachment, holding and centering of the end bells are not dealt with in detail either in FIG. 1.

Figure 2:
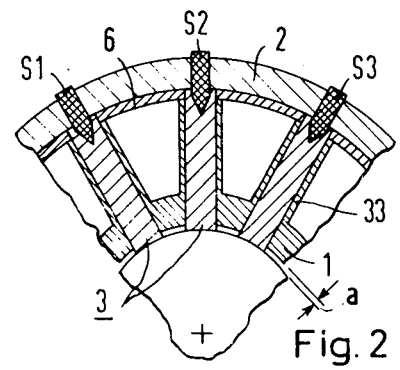
FIG. 2 is a partial radial cross-sectional view of the stator according to the present invention in the vicinity of the welds and showing the air gaps according to the invention.

The radial inner ends of the pole pieces 3 protrude out of the hollow cylinder 1 by a predetermined distance referenced in FIG. 2 by "a". The inner wall of the hollow cylinder is thereby set back by the distance "a" from the outside dimension of the bore. This set back provides minimum sized air gaps on the inner wall of the hollow cylinder. The distance "a" is approximately 0.6 mm when the interior diameter of the pole piece star is from about 6 mm to about 20 mm. The distance "a" increases to approximately 1 mm when the interior diameter of the pole piece star is more than about 20 mm.

According to the preferred embodiment of the invention, the hollow cylinder is produced as an injection molded part with the pole pieces simultaneously molded therein. A cylindrical core mold is used in the injection molding of the hollow cylinder. The core mold corresponds to the rotor bore and is provided with axially extending slots having a width corresponding to the thickness of the radial inner edges of the pole pieces and a depth corresponding to the distance "a".

The pole pieces 3, which, as mentioned, are simultaneously molded into the hollow cylinder 1, have axial projections 31 and 32 at the end faces of their radial inner ends which are anchored in the hollow cylinder 1, for the purpose of additionally securing them in the radial direction. The cylinder 1 is axially extended beyond the coil head. Breakthroughs 36 shown in FIG. 3 can also serve advantageously for additional mechanical securing during the injection molding.

Approximately at its axial center, the ring housing 2 is welded to the pole pieces 3 in a short axial zone (zone S) by means of laser beam welding starting from its outer circumference. The "welded seams" are indicated in FIG. 2 by the reference symbols S1, S2 and S3. In this manner, a mechanically firm attachment and a low resistance magnetic flux transition between the pole pieces 3 and the ring housing 2, serving as the magnetic return, are obtained even if the plastic hollow cylinder 1 should shrink.

Figure 4:
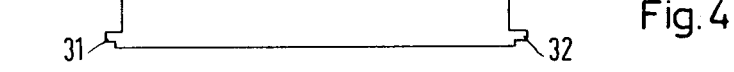

As can be seen in FIG. 2, the lateral surfaces of the pole pieces facing the winding are provided with insulating wall parts 33, which may be sprayed on simultaneously with the manufacture of the hollow cylinder 1, like the insulating end face coatings known per se, or they can be inserted as individual insulation parts, like separate insulating end plates. In addition, cover slides 34 may be provided (FIG. 4).

Figure 3:
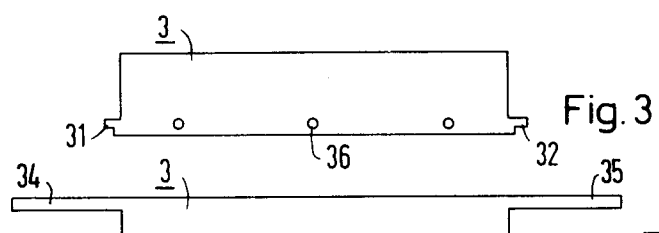
FIGS. 3, 4 and 5 illustrate different pole piece lamination outlines.
Figure 5:
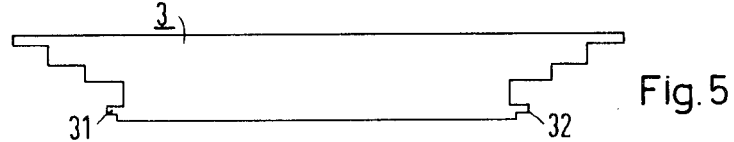
Figures 6, 7:
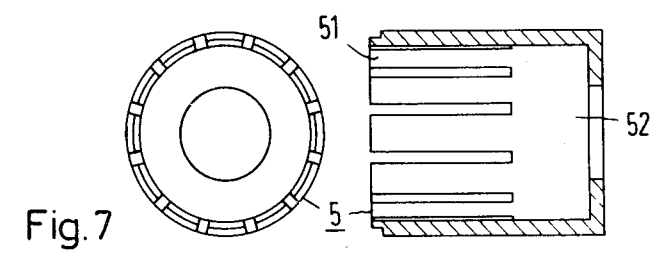
FIG. 6 is an axial cross-sectional view of a coil head insulation cap.
FIG. 7 is a radial cross-sectional view of the coil head insulation cap of FIG. 6.

FIG. 3 shows a pole piece lamination outline with a contour which is rectangular in the exposed region (winding space). Such a shape is advantageous particularly if the stator winding is made by the winding insertion technique, where prefabricated coils are placed in the pole piece star from the outside. FIG. 4 shows a pole piece lamination outline, in which the pole pieces are additionally provided with projecting posts 35 which extend in the axial direction at their radial outer end, whereby a particularly good slot filling factor can be obtained if the stator winding is applied by means of the needle winding technique. A special embodiment of the pole piece lamination outline of FIG. 4 is shown in FIG. 5, where the end faces of the pole pieces are designed in steps with a cross section increasing toward the ring housing. FIGS. 6 and 7 show, in different views, cup-like plastic caps 6 which are pushed over the coil ends of the winding 4 at the end faces and inserted into the pole piece star. They center themselves at the cylindrical part of the pole piece star and extend with axial, comb-like extensions 51 into the slot spaces of the winding, covering up at least the slot space near the ring housing. When the pole piece star with its winding is pushed into the surrounding ring housing, such insulating caps 5 protect the winding mechanically against damage, as they cover the coil ends arranged in the cup shaped space 52 on all sides, and the winding parts located in the slots are protected and secured toward the slot opening.

According to another aspect of the invention, the hollow cylinder is produced as a reusable clamping tool which is removed from the stator after the stator has been firmly assembled.

The advantages of the present invention, as well as certain changes and modifications of the disclosed embodiment thereof, will be readily apparent to those skilled in the art. It is the applicants' intention to cover by their claims all those changes and modifications which could be made to the embodiment of the invention herein chosen for the purposes of the disclosure without departing from the spirit and scope of the invention.

What is claimed is:

1. An improved method for constructing the stator for an electric polyphase motor, particularly a stepping motor, which includes a closed ring housing and pole piece star inserted therein, the pole piece star having axially integral pole pieces which are arranged in starlike fashion about and inserted into a hollow cylinder, comprising forming the hollow cylinder with axial slots extending through the cylinder and the interior wall thereof to the interior of the cylinder and the pole pieces in the axial slots of the hollow cylinder with their radial inner edges extending into the bore diameter of the hollow cylinder and beyond the inner wall of the hollow cylinder by a predetermined small distance to provide air gaps without requiring further finishing operations of the hollow cylinder after the stator is assembled.

2. The method recited in claim 1 wherein the predetermined small distance is approximately 0.6 mm when the interior diameter of the pole piece star is from about 6 mm to about 20 mm and increases to approximately 1 mm when the interior diameter of the pole piece star is more than about 20 mm.

3. The method recited in claim 1 and further comprising forming the pole pieces and the plastic hollow cylinder as a unit by a molding process.

4. The method recited in claim 3, wherein the pole piece/hollow cylinder unit is made by injection molding.

5. The method recited in claim 4 and further comprising disposing the pole pieces in a cylindrical core mold corresponding to the bore of the rotor which has axially extending slots, the widths of which correspond to the thickness of the radial inner edges of the pole pieces and the depths of which correspond to the predetermined small distance.

6. The method recited in claim 1 and further comprising high-energy beam welding the radial outer ends of the pole pieces to the inside of the surrounding ring housing starting from the outer circumference of the ring housing.

7. The method recited in claim 6, wherein radial outer edges are laser-beam welded to the ring housing.

* * * * *